United States Patent [19]
Hatta

[11] Patent Number: 5,598,578
[45] Date of Patent: Jan. 28, 1997

[54] DATA PROCESSING SYSTEM HAVING EVENT WORD HANDLING FACILITY WHICH CAN SEND EVENT WORD OF HIGHER SIGNIFICANCE WITHOUT FAILURE

[75] Inventor: Masahiro Hatta, Kawasaki, Japan

[73] Assignee: Fujitsu Limited, Kawasaki, Japan

[21] Appl. No.: 214,283

[22] Filed: Mar. 17, 1994

[30] Foreign Application Priority Data

Jun. 21, 1993 [JP] Japan ..................... 5-148765

[51] Int. Cl.⁶ ..................................... G06F 13/00
[52] U.S. Cl. .................. 395/835; 395/485; 395/877; 364/941.6
[58] Field of Search .................... 395/275, 425, 395/650, 835, 877, 485; 364/941.6

[56] References Cited

U.S. PATENT DOCUMENTS

| | | | |
|---|---|---|---|
| 4,817,092 | 3/1989 | Denny | 395/182.08 |
| 4,860,190 | 8/1989 | Kaneda et al. | 395/275 |
| 4,918,599 | 4/1990 | Hashimoto et al. | 395/725 |
| 5,056,011 | 10/1991 | Yoshitake et al. | 395/425 |
| 5,146,595 | 9/1992 | Fujiyama et al. | 395/725 |
| 5,220,668 | 6/1993 | Bullis | 395/650 |
| 5,231,633 | 7/1993 | Hluchyj et al. | 370/94.1 |
| 5,268,900 | 12/1993 | Hluchyj et al. | 370/94.1 |
| 5,325,536 | 6/1994 | Chang et al. | 395/725 |

FOREIGN PATENT DOCUMENTS 0365731  5/1990  European Pat. Off. ........ G06F 15/16

Primary Examiner—Alyssa H. Bowler
Assistant Examiner—Robert E. Stachler, II
Attorney, Agent, or Firm—Staas & Halsey

[57] ABSTRACT

A channel subsystem provided for connection of a large number of peripheral devices has an event word handing facility whereby an event word for reporting a failure, etc., occurring in a peripheral device, to a main CPU, is generated and queued in a buffer that is accessible from the main CPU. The event word handling facility provided in the channel subsystem of the present invention includes: an inhibit word count register for storing a plurality of inhibit word counts whose values are set closer to the capacity of the buffer as the significance of their associated event words increases; a selector for selecting an inhibit word count appropriate to the event word to be generated; and a comparator for comparing the selected inhibit word count with the number of event words currently held in the buffer. Only when the number of event words held in the buffer is smaller than the selected inhibit word count, is an event word generated. Thus, an event word of higher significance can be notified without fail.

6 Claims, 3 Drawing Sheets

DATA PROCESSING SYSTEM HAVING EVENT WORD HANDLING FACILITY WHICH CAN SEND EVENT WORD OF HIGHER SIGNIFICANCE WITHOUT FAILURE

BACKGROUND OF THE INVENTION

1. Field of the Invention

The present invention relates to a data processing system having a facility for handing words which represent the occurrence of events (hereinafter called "event word"), wherein an event word, as it occurs, is first placed in a queue and then reported to a processing destination, and more particularly to a data processing system having an event word handling facility whereby an event word of higher significance can be reported without fail.

2. Description of the Related Art

In a large general-purpose computer or a supercomputer to which are connected a large number of peripherals such as disk devices, MT devices, printers, etc., a channel subsystem, which includes a plurality of channel processors for controlling individual peripheral devices connected to respective channels and an I/O processor responsible for overall control of the plurality of channel processors, are provided in order to improve data transfer speeds to and from the peripheral devices.

In a computer system of the above configuration, when a certain failure occurs in a peripheral device, the occurrence of the failure event is notified to the I/O processor via the channel processor responsible for controlling that peripheral device. When alerted to the occurrence of the failure event, the I/O processor places an event word associated therewith into a queue buffer, which is also accessible from the main CPU, and at the same time, sends a machine check interrupt to the main CPU. The main CPU then handles the interrupt and performs the necessary processing by sequentially reading out the event words queued in the buffer.

Failures that may occur in peripheral devices can be classified into two types: a minor failure that can be recovered by a self-recovery process at the subsystem side; and a major failure from which such recovery is not possible. In either case, the failure occurrence is queued as an event word in the buffer. When alerted to the occurrence of a major failure, the main CPU issues, for example, a system reset command for an I/O interface for recovery by software. When the system reset by the I/O interface is complete, this event also is reported to the main CPU. If the completion of the system reset is not reported within a predetermined period, the main CPU performs the necessary processing, such as, isolating the failed peripheral device from the system.

In the above-described system, the number of event words that can be held in the buffer is finite, and when the buffer overflows, newly occurring event words will be discarded.

As described above, an event word is generated in the event of a failure occurring in a channel device or an input/output device or at the completion of a system reset by the I/O interface, for example. For a minor failure for which hardware recovery has been successfully carried out, the same kind of event word may recur, and no serious problem will be caused even if such an event word is discarded and no report made. On the other hand, in the case of a major failure for which hardware recovery has failed, or an event such as the completion of a system reset by the I/O interface, there is less possibility that the same kind of event word will recur; therefore, if reporting of such events cannot be done, there arises a problem that software recovery processing by the main CPU cannot be performed.

However, in the prior art, the system is such that, when the buffer becomes full of event words, any subsequent event word is discarded regardless of the kind of event word. The resulting problem is that when minor failures occur repeatedly and the buffer becomes full, any major failure occurring after that cannot be reported.

SUMMARY OF THE INVENTION

The present invention is concerned with a data processing system having an event word handling facility wherein an event word, as it occurs, is first queued in a buffer and then reported to a processing destination, and an object of the invention is to provide a data processing system having a novel event word handling facility whereby an event word of higher significance can be reported without fail.

According to the present invention, there is provided a data processing system having an event word handling facility wherein an event word, as it occurs, is first temporarily stored in a buffer and then reported to a processing destination, comprising: means for storing a plurality of threshold values; means for selecting one threshold value, appropriate to the kind of the event word to be generated, from among the plurality of threshold values stored in the storing means when a condition for generating the event word has occurred; means for comparing the threshold value selected by the selecting means with the quantity of event words stored in the buffer; and means for storing the event word into the buffer in accordance with the result of the comparison made by the comparing means.

DESCRIPTION OF THE PREFERRED EMBODIMENTS

Figure 1:
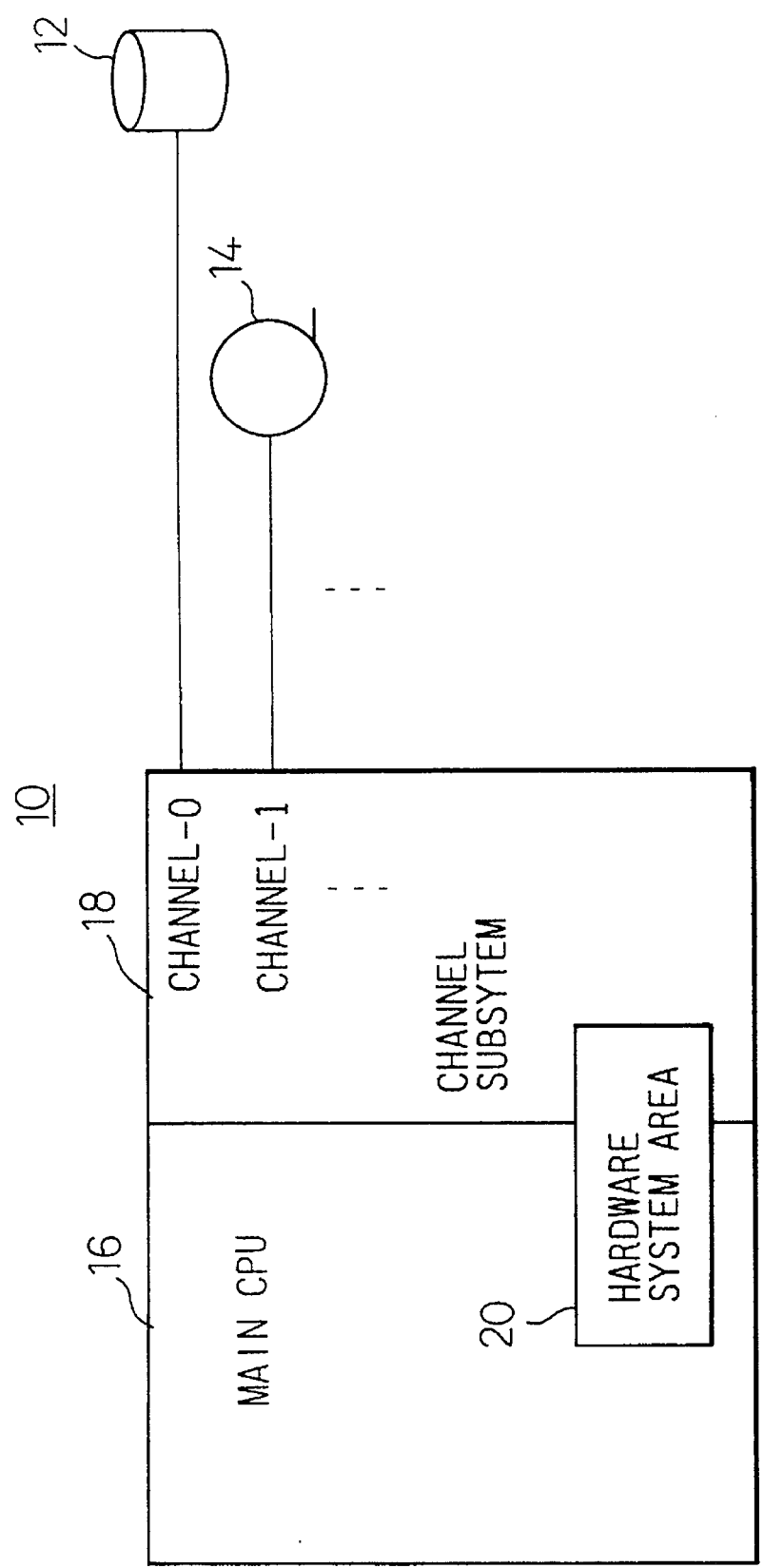
FIG. 1 is a block diagram showing a computer system to which the present invention is applied.

FIG. 1 is a block diagram showing the configuration of a computer system to which the present invention is applied. In FIG. 1, the computer system 10 comprises a main CPU 16 and a channel subsystem 18 that operates independently of the main CPU 16 to control peripheral devices. Peripheral devices, such as a disk device 12 and an MT device 14, are connected to respective channels 0, 1, . . . of the channel subsystem 18. A hardware system area 20 allocated within a main memory is accessible from the channel subsystem 18 as well as from the main CPU 16. Access to the hardware system area 20 from the CPU 16 is made using a microprogram; direct access from software is not possible.

Figure 2:
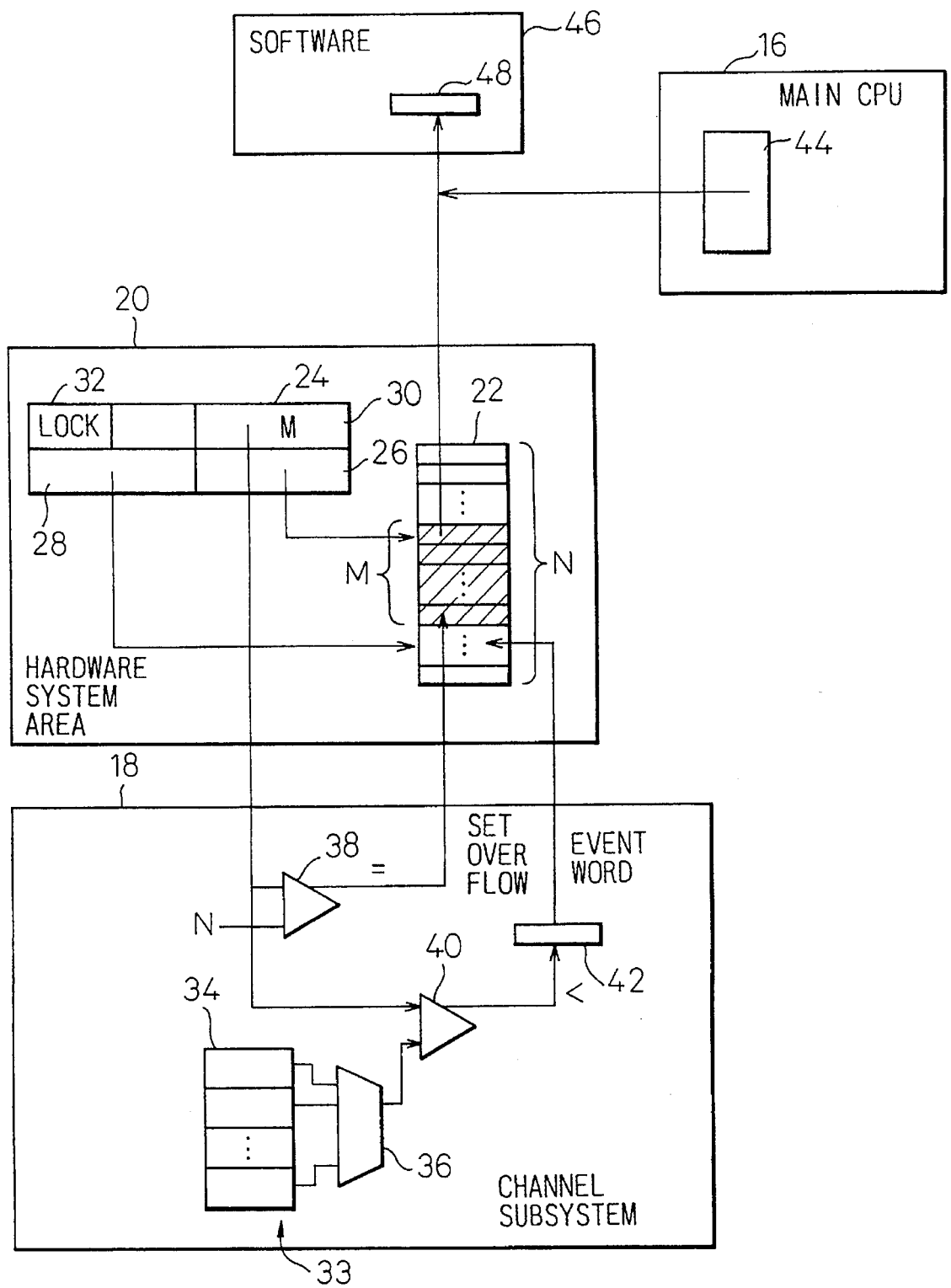
FIG. 2 is a diagram illustrating conceptually the operation of a channel subsystem according to the present invention.

FIG. 2 is a block diagram illustrating conceptually the operation of the channel subsystem 18 according to the present invention.

The hardware system area 20 includes an event word area 22 consisting of a ring buffer of a first-in, first-out structure for temporarily storing event words held therein, and an event word control area 24 for storing information for controlling the event words queued in the event word area 22.

The event word control area 24 stores, more specifically, a pointer 26 that points to the entry position of the oldest event word queued in the event word area 22, a pointer 28 that points to the entry position of the next event word to be queued, a count 30 indicating the number of event words currently queued in the event word area 22, and a flag 32 for exclusive control. In the figure, the number of entries, representing the capacity of the event word area 22, is denoted by N, and the number of event words currently queued in the event word area 22 is denoted by M.

The channel subsystem 18 is provided with an event word handling facility 33 which includes an inhibit word count register 34, a selector 36, and comparators 38, 40. The inhibit word count register 34 stores inhibit word counts which are determined according to the kind (significance) of event words. In the channel subsystem 18, when a condition for generating an event word occurs, such as the occurrence of a failure in any of the peripheral devices 12, 14, or the completion of a system reset by the I/O interface, the selector 36 selects the inhibit word count appropriate for the kind (significance) of event word to be generated, and the selected inhibit word count is then compared in comparator 40 with the event word count M currently stored. If M is smaller than the selected inhibit word count, an event word 42 is generated, and stored into the event word area 22 at the same time that the contents of the event word control area 24 are updated. If M is equal to or greater than the selected inhibit word count, then the generation of the event word 42 is inhibited. The comparator 38 compares M with the entry count N of the event word area 22, and if M is equal to N, a flag indicating an overflow condition is set in the last stored event word.

The inhibit word count stored in the inhibit word count register 34 is, for example, N–4 for a minor failure such as a channel path temporary error, and N for the completion of a system reset. In this manner, the inhibit word count is determined so that the value is made closer to N as the significance of the corresponding event word increases.

Once the event word 42 has been queued in the event word area 22, the channel subsystem 18 sends a machine check interrupt to the main CPU 16. In response to the machine check interrupt, the main CPU 16 activates a machine check interrupt service microprogram 44 to sequentially read out each of the event words queued in the event word area 22 and store it into an operand area 48 in a software area 46. The event word is thus notified to the software 46.

Figure 3:
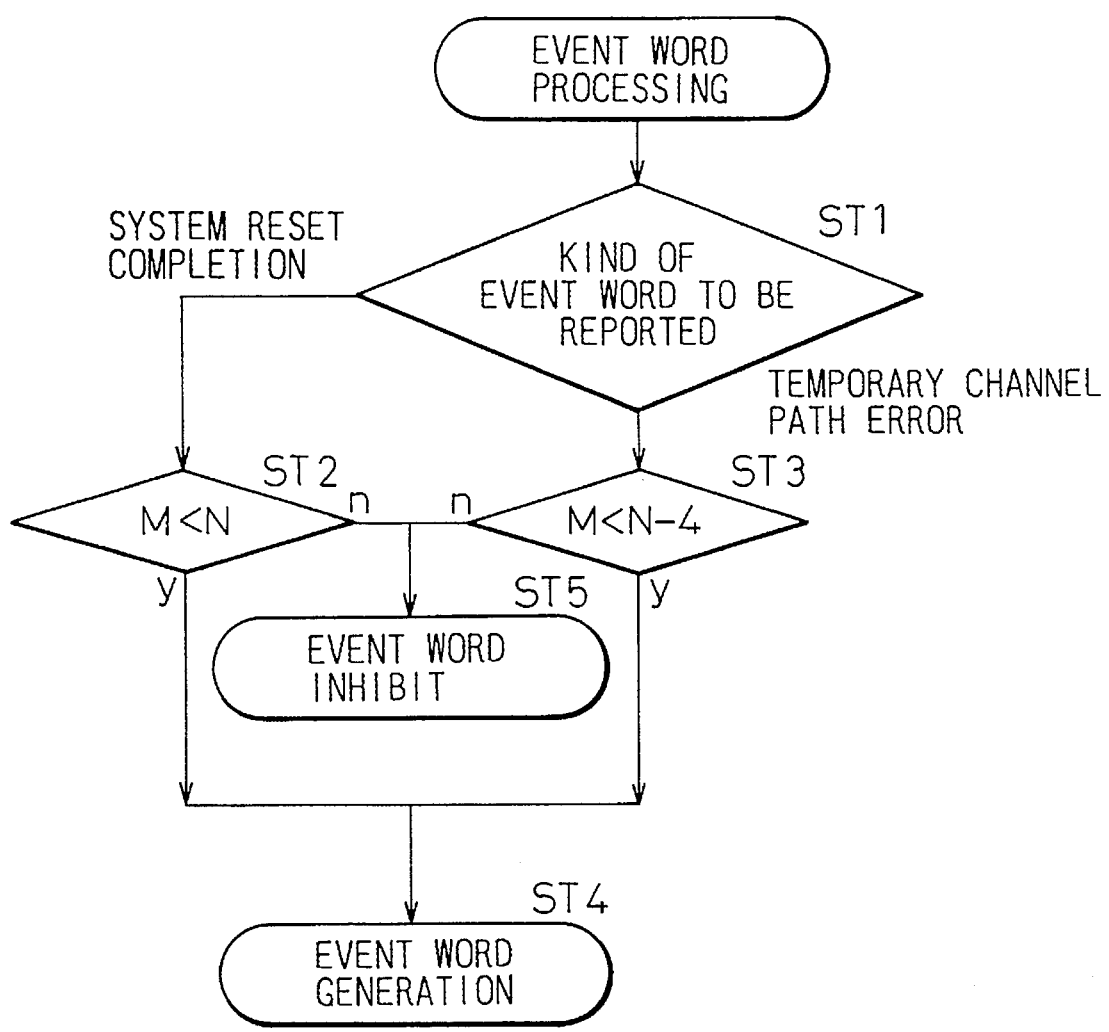
FIG. 3 is a flowchart for explaining the operation of the channel subsystem according to the present invention.

FIG. 3 is a flowchart for explaining the operation of the event word handling facility 33 provided in the channel subsystem 18 described with reference to FIG. 2.

When a condition for generating an event word occurs, the event word handling facility 33 first determines in step ST1, in the process flow shown in FIG. 3, whether the event word to be reported is for a system reset completion or a temporary channel path error.

If it is determined in step ST1 that the event word to be reported is for a system reset completion, then the process proceeds to step ST2, where a reference is made to the contents of the event word control area 24 in the hardware system area 20 to recognize the value "M" representing the number of event words currently queued in the event word area 22, and then the threshold value "N" corresponding to a system reset completion is read out of the inhibit register 34, after which the values "M" and "N" are compared to determine which value is larger.

If it is found in step ST2 that M<N, then the process proceeds to step ST4 where the event word for the system reset completion is queued in the event word area 22. If it is found otherwise in step ST2, then the process proceeds to step ST5 and the request for generation of the event word for the system reset completion is ignored.

On the other hand, when it is determined in step ST1 that the event word to be reported is for a temporary channel path error, then the process proceeds to step ST3, where a reference is made to the contents of the event word control area 24 in the hardware system area 20 to recognize the value "M" representing the number of event words currently queued in the event word area 22, and then the threshold value "N–4" corresponding to a temporary channel path error is read out of the inhibit register 34, after which the values "M" and "N" are compared to determine which value is larger.

If it is found in step ST3 that M<N–4, then the process proceeds to step ST4 where the event word for the temporary channel path error is queued in the event word area 22. If it is found otherwise in step ST4, then the process proceeds to step ST5 and the request for generation of the event word for the temporary channel path error is ignored.

Thus, according to the event word handling facility 33, when the value "M" representing the number of event words currently queued in the event word area 22 is smaller than "N–4", the event word, whether for a temporary channel path error or for a system reset completion, is queued in the event word area 22 so that it can be notified to the software. On the other hand, when the value "M" representing the number of event words currently queued in the event word area 22 is larger than "N–4" (but smaller than "N"), only the event word for a system reset completion is queued in the event word area 22 for notification to the software.

With the above process structure, if a large number of event words are generated because of temporary channel path errors of lower significance, exceeding the processing capacity of the machine check interrupt servicing program 44 and resulting in the number of event words continuing to increase in the event word area 22, the event word area 22 is prevented from becoming full. Therefore, if, after that, an event word of higher significance is generated for a system reset completion, the event word for the system reset completion can be queued in the event word area 22 without fail, thus ensuring that the event word will be reported to the processing destination with certainty.

The present invention is not restricted to the illustrated embodiment. For example, in the above embodiment, the invention has been described by taking as an example the report processing of event words issued by the channel subsystem, but it will be appreciated that the invention is not limited to this example.

I claim:

1. A data processing system having an event word handling facility wherein an event word, as it occurs, is first temporarily stored in a buffer and then reported to a processing destination, comprising:

means for storing a plurality of threshold values;

means for selecting a threshold value, appropriate to a kind of the event word to be generated, from among said plurality of threshold values when a condition for generating the event word has occurred;

means for comparing the selected threshold value with a numerical value indicating a quantity of event words stored in said buffer; and means for storing said event word into said buffer in accordance with a comparison result made by said comparing means.

2. A data processing system according to claim 1, wherein said plurality of threshold values is determined according to a relative significance of a plurality of event words.

3. A data processing system according to claim 2, wherein said plurality of threshold values is determined so that an event word of a relatively high significance is assigned a threshold value correspondingly close to a numerical value indicating a capacity of said buffer.

4. A data processing system according to claim 3, wherein an event word is stored by said storing means when the numerical value indicating the quantity of event words stored in said buffer is less than the selected threshold value.

5. The data processing system according to claim 1, wherein said storing means stores the event word when the threshold value is greater than the numerical value indicating the quantity of event words stored in said buffer.

6. A data processing system having an event word handling facility with a buffer, comprising:

means for storing a plurality of threshold values;

means for selecting one of the plurality of threshold values appropriate to an event word to be generated when a condition for generating the event word has occurred;

means for comparing the selected threshold value with a numerical value indicating a quantity of event words stored in the buffer; and means for storing the event word into the buffer in accordance with a comparison result made by the comparing means.

* * * * *